April 28, 1925.
D. E. FULTZ ET AL
1,535,821
SPRING WHEEL
Filed March 20, 1924
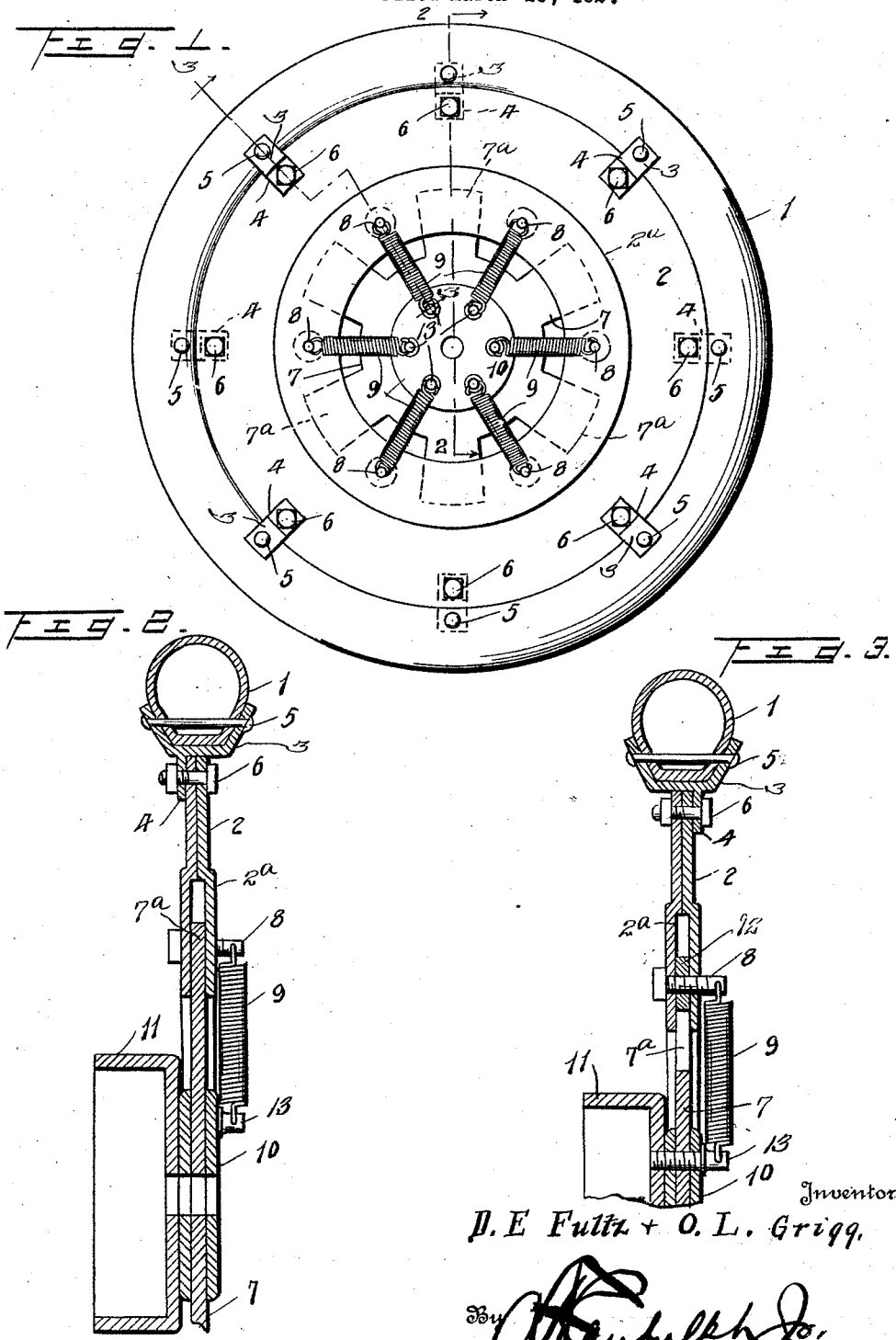
Inventor
D. E. Fultz + O. L. Grigg.
By
Attorney Patented Apr. 28, 1925.

1,535,821

UNITED STATES PATENT OFFICE.

DAVID E. FULTZ AND OTIS L. GRIGG, OF MADILL, OKLAHOMA.

SPRING WHEEL.

Application filed March 20, 1924. Serial No. 700,658.

*To all whom it may concern:*

Be it known that we, DAVID E. FULTZ and OTIS L. GRIGG, citizens of the United States, residing at Madill, in the county of Marshall and State of Oklahoma, have invented certain new and useful Improvements in Spring Wheels; and we do hereby declare the following to be a full, clear, and exact description of the invention, such as will enable others skilled in the art to which it appertains to make and use the same.

The invention has relation to vehicle wheels and has for its object to provide a wheel which neutralizes shock and vibration and practically possesses all the advantages of a wheel equipped with a pneumatic tire, but which is free from puncture, blowout, rim cut and like troubles incident to pneumatic tires.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a side view of a spring wheel embodying the invention,

Figure 2 is an enlarged sectional view on the line 2—2 of Figure 1, and

Figure 3 is an enlarged sectional view on the line 3—3 of Figure 1.

Corresponding and like parts are referred to in the following description and designated in the several views of the drawings by like reference characters.

The tire 1 is preferably hollow and is provided with an annular web 2 held in place by yokes 3 which embrace the inner side of the tire 1 and which have inwardly disposed lugs 4 to which the web 2 is bolted. The yokes 3 may be attached to the tire 1 by means of bolts 5, or in any preferred way, and the annular web 2 may be attached to the lugs 4 by means of bolts 6 or in any preferred way.

A spider or hub center 7 has its outer portion loosely fitted between spaced portions $2^a$ of the annular web 2 and this spider has a limited eccentric movement. Bolts 8 are disposed between the projecting elements $7^a$ of the spider or hub center 7 and limit the movement thereof and also have the outer ends of helical springs 9 connected thereto, the inner ends of said springs being connected to the spider or hub center. Spacing blocks 12 are mounted on bolts 8 and are seated between the spaced portions $2^a$. The springs 9 are normally under tension and are adapted to sustain the load and compensate for shock and vibration. The hub 10 is secured to the spider or part 7 and to the brake drum 11 by means of screw bolts 13. As shown the springs 9 are terminally connected to bolts 8 and 13.

It will be understood from the foregoing and the drawings hereto attached that the invention results in the provision of a supporting wheel of simple construction, of few parts and capable of neutralizing shock and vibration.

What is claimed is:

1. A vehicle wheel comprising a tire, an annular web within the tire and attached thereto, a spider within the annular web and having its outer portion comprised between spaced portions thereof, and substantially radial spring connections between the spider and web.

2. A vehicle wheel comprising a tire, an annular web within the tire, fittings connecting the web and tire, a spider having its outer portion comprised between spaced portions of the annular web, fastenings extending between the spaced portions of the spider and supported by the spaced portions of the annular web, and substantially radial spring connections between the annular web and spider.

3. A vehicle wheel having a web provided with a recess, a spider having projections extending into the recess, fastening elements extending through and laterally beyond the web intermediate said projections, hub means associated with said spider, fastenings securing said means thereto and extending laterally beyond said means, and substantially radially arranged spiral springs connected to the extensions of said fastening elements and said fastenings.

In testimony whereof we affix our signatures in presence of two witnesses.

DAVID E. FULTZ.
OTIS L. GRIGG.

Witnesses:
C. B. COBB,
N. F. KIRKWOOD.